Nov. 14, 1939.      R. O. BOEHNKE      2,179,538
GAUGE
Filed June 9, 1937      2 Sheets-Sheet 2
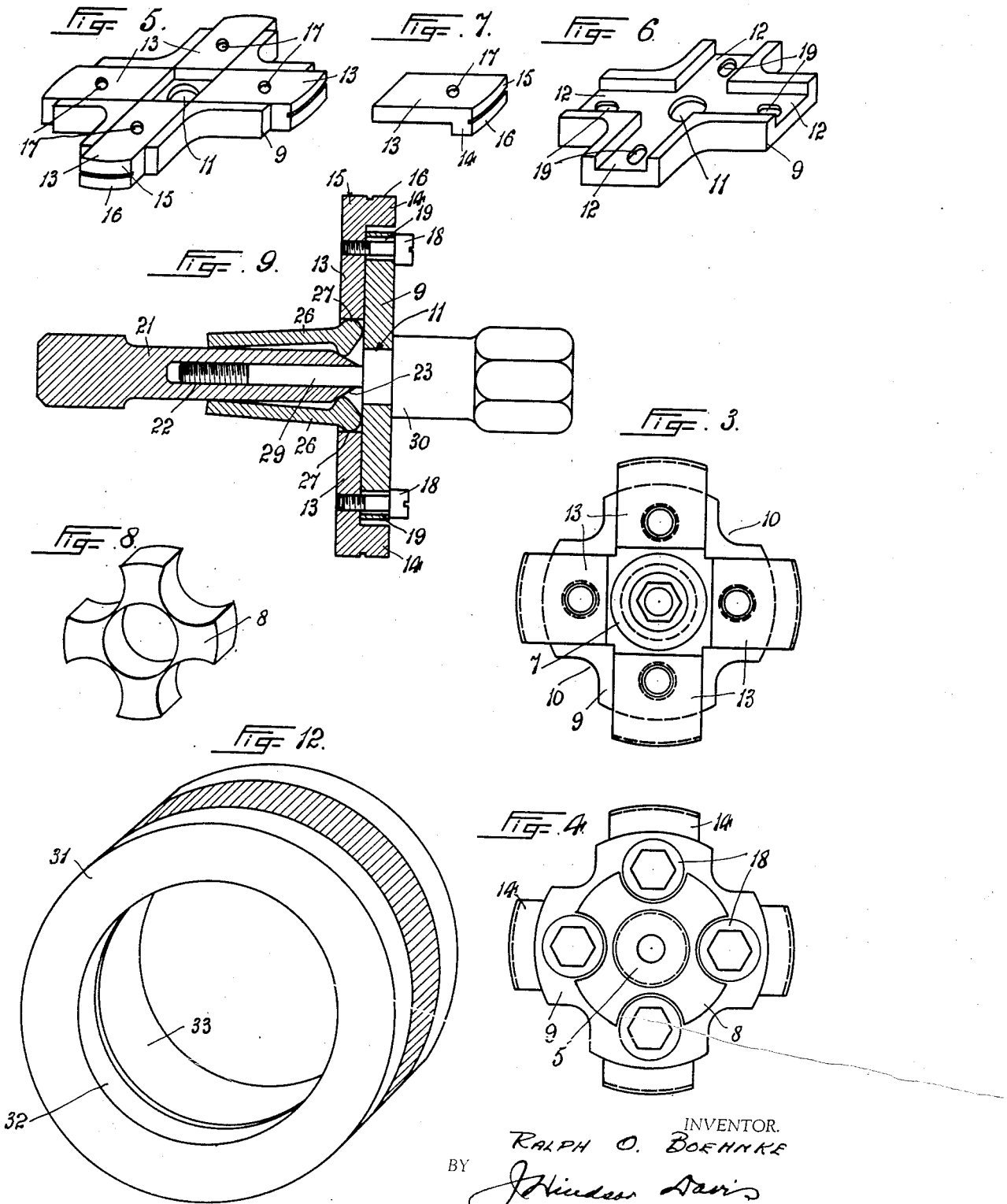

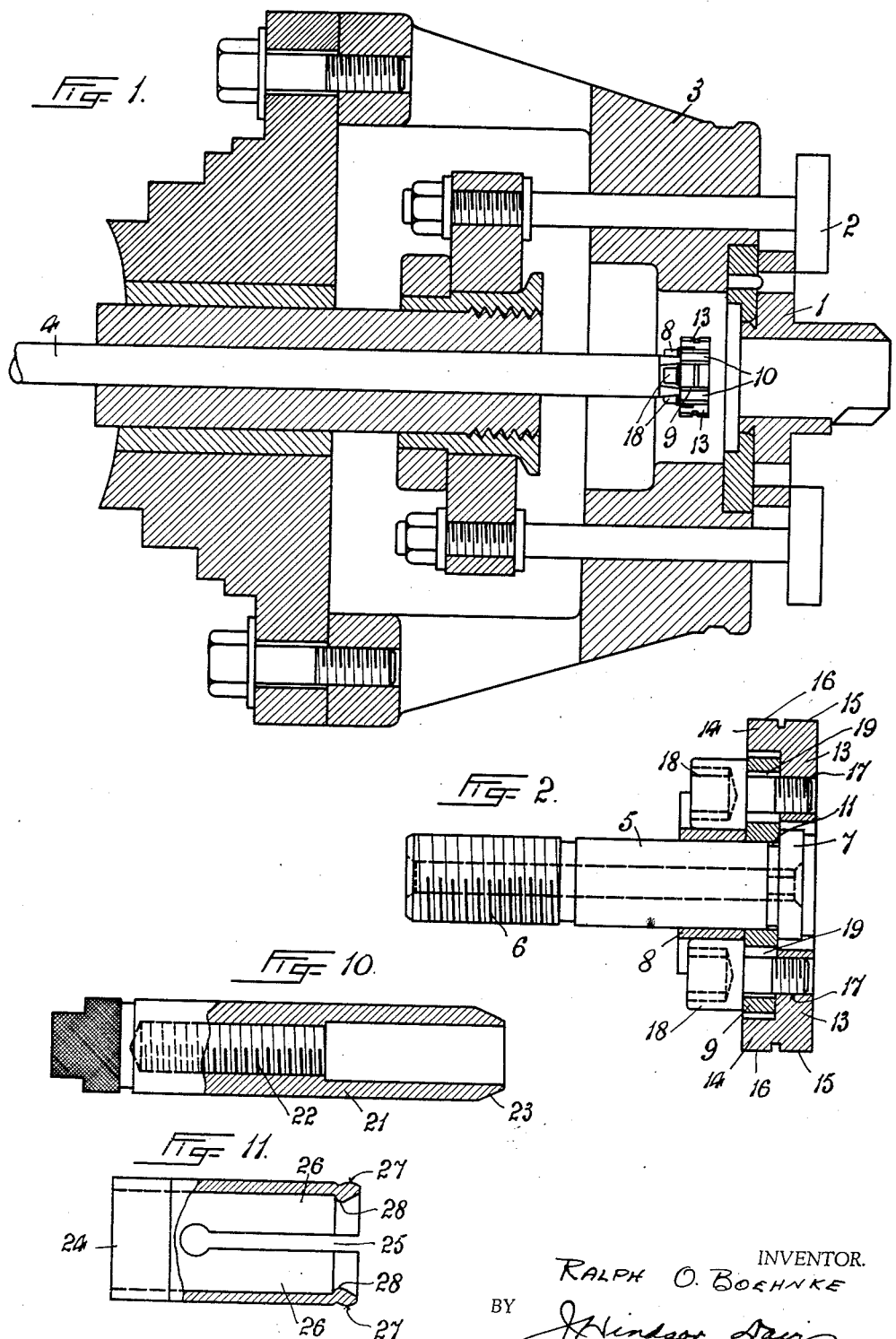

Patented Nov. 14, 1939

2,179,538

UNITED STATES PATENT OFFICE 2,179,538

GAUGE

Ralph O. Boehnke, Ann Arbor, Mich.

Application June 9, 1937, Serial No. 147,203

1 Claim. (Cl. 33—178)

This invention relates to gauges, and more especially those of the type such as are used in automatic self-gauging grinding machines for internal grinding wherein the bore of the work is periodically tested at intervals during the operation of the machine by a gauge automatically moved by hydraulic or other means into testing position. In such machines the gauge is usually of a positive solid type the periphery of which is ground in 2 steps, the first of which is undersized and represents the rough size of the hole to be ground, and the second of which represents the finished size. In some machines when the rough size of the gauge in its testing motion enters the bored hole of the work the machine is automatically slowed down for the finish grinding, the completion of which is determined by the entrance of the finish size of the said gauge into the hole on a subsequent testing motion.

On machines where considerable production is involved, the accurate life of such gauges may be relatively short, and, in any case, the slightest variation in the desired diameter of the hole in the work calls for substitution of one size of gauge for another, there being no provision for variation in the gauge itself; and it is an object of the present invention to provide a gauge which may be utilized in such a machine as that heretofore referred to, although not necessarily limited to such use, which is characterized by its being adjustable as to gauge diameter within reasonable limits either to correct the effects of wear or to adapt it to work of the various bores, or to permit re-grinding of the gauge.

More particularly it is an object of the invention to provide a gauge having radially adjustable inserts or fingers capable of being set to equal radial positions for the gauging of various diameters of holes within the limitations of adjustment of the said inserts, or of being extended somewhat beyond your required gauge diameter and their extremities ground back to the desired extent, as will be understood.

The invention also contemplates the provision of gauge adjusting means in the form of a tool adapted to effect an even radial movement of inserts when expanding the gauge for use on the larger sized hole or for re-grinding, or to take up wear; and more particularly contemplates a radially expandible arbor for the gauge adapted to contact the inter-rings of the inserts and means for effecting the expansion of the said arbor.

A further object is to provide for the use of such an expanding arbor as the spindle or stem of the gauge in use, as in a grinding machine, where desirable.

To provide for a use of such of an adjusting tool, such as that referred to, it is a further object of the invention to provide, in an adjustable gauge of the type referred to, radially moveable inserts the inner ends of which are exposed for contact with the adjusting tool and bear a definite dimensional relationship to the extremities of the inserts so that even adjustment of the inserts may be effected.

Still further objects subsidiary to the aforesaid objects, or resulting from the construction or operation of the invention as it may be carried into effect, will become apparent as the said invention is hereinafter further disclosed.

In carrying the invention into effect, I may provide a spindle threaded for attachment to the reciprocal gauge bar of a grinding machine, a gauge body adapted to be held on said spindle in position against a shoulder on the outer end of the spindle, said body having radial ways or recesses therein in which inserts are slidably positioned, the extremities of the said inserts being ground in steps to provide rough and finish gauge surfaces, and means for locking the inserts in positions of a radial adjustment. For effecting such radial adjustment I may provide an expansion arbor which may replace the spindle and which may be threaded for attachment to the reciprocal gauge bar to form the working support of the gauge if desired, this arbor including an expandible member to engage the inner ends of the said inserts, and provided with means to manually effect the expanding of the said sleeve. All of which is more particularly described and ascertained hereinafter, by way of example, having reference to the accompanying drawings, wherein:

Figure 1 is a sectional view of the chuck of an internal grinding machine showing in elevation the improved gauge in position on the machine;

Figure 2 is a longitudinal sectional view of the gauge removed;

Figure 3 is a front end elevation of the gauge;

Figure 4 is a rear end elevation of the gauge;

Figure 5 is a perspective view of the gauge body with inserts;

Figure 6 is a perspective view of the gauge body with inserts removed;

Figure 7 is a perspective view of one of the gauge inserts;

Figure 8 is a perspective view of the spacer;

Figure 9 is a sectional elevation of the expanding arbor applied to the gauge, the tightening screw being shown in full elevation;

Figure 10 is a detail elevation, partly in section, of the arbor spindle;

Figure 11 is a detail elevation, partly in section, of the expanding sleeve; and Figure 12 is a detail perspective view of a ring gauge such as may be used in determining the setting of the adjustable gauge.

Similar characters of reference indicate similar parts in the several figures of the drawings.

1 indicates the work secured by the clamping ring 2 in the chuck 3 of a grinding machine in the manner well known, and 4 is a reciprocal bar hydraulically or otherwise operated in a machine of this type, to effect the periodical movement of a gauge carried thereby up to the work for the purpose of automatically determining when the grinding of the work is nearing completion or is completed. It is customary to attach to the working end of this bar the usual solid gauge in the form of a disk the periphery of which is ground in steps to gauge the rough and finish diameters of the hole being ground in the work.

In place of such gauge, I provide an adjustable gauge which, in this example, is shown as including a spindle 5 threaded at 6 for attachment to the bar 4 and having an angular enlargement or shoulder 7 at its outer end. Slidably mounted on the said spindle, and in its working position held firmly against the said shoulder 7 by virtue of pressure of the end of the hollow bar 4 against a spacer 8, is the body 9 of the gauge, which body is shown as being of a cruciform configuration to provide peripheral passageways 10 permitting the flow of cooling fluid around the gauge when in use.

11 indicates the central artifice in the body through which the spindle 5 passes, and the rear face of the said body is shown as being radially recessed at 12 to form the ways for inserts 13, which in this case have offset outer end portions 14 extending beyond and over the periphery of the said body. The extremities of these inserts are ground at 15 and 16 to provide gauging surfaces, the surface 15 being for rough gauging and the surface 16 for the finish gauging.

The inserts are also each drilled and tapped at 17 to receive the threaded stems of set screws 18, which stems pass through slots or openings 19 in the body, the said slots 19 being elongated radially of the body 9 to permit radial adjustment of the said inserts and their set screws. Thus it will be seen that the said inserts may be secured in any position of radial adjustment which the elongated slots will allow.

Where on the larger sizes the heads of the set screws are sufficiently spaced from the spindle 5, the end of the bar 4 may be brought into direct contact with the rear face of the body 9 of the gauge to effect the secure positioning of the said body against the end shoulder of its spindle, but in the smaller sizes it may be necessary to so space the said screws that such contact may not be directly established and in such case a spacer or washer 8, of the more or less cruciform configuration and of a thickness greater than that of the heads of the set screws, may be interposed between the end of the said bar 4 and the rear face of the body as shown in Figure 2. Of course, this expedient may be adapted irrespective of whether it is the end of the bar 4, or any other member which may be provided on the machine, which effects similar positioning of the gauge body on its spindle.

It will be apparent that, by loosening the set screws, the inserts of the gauge may be moved radially to take up wear on the outer ends thereof, or to set them to gauge larger or smaller diameters, or to permit them to be re-ground back to an original dimension according to requirements; and to facilitate for resetting or adjustment of the inserts, and more particularly to secure even radial movement thereof it is proposed to provide an expanding arbor or adjusting tool capable of imparting or determining identical radial positioning of the inserts relative to the axis of the gauge.

A suitable form of this tool is shown in Figures 8, 9, and 10, as comprising a hollow spindle 21 internally threaded at 22 and having a tapered nose 23. This spindle enters a sleeve 24, the forward portion of which is slotted as at 25 to provide resilient fingers 26 on the ends of which are formed bearing surfaces 27 preferably somewhat rounded in cross-sectional contour. Within the extremities of the said fingers 26 are internal abutments 28 adapted to be contacted by the tapered nose of the spindle 21 when the said spindle is passed through the sleeve 24 from the rear end thereof. The said abutments 28 are so suitably shaped that they will ride up the tapered surface of the nose of the spindle, if such contact be accompanied by sufficient pressure, thus expanding the said fingers 26 radially of the spindle. To produce such pressure I show a screw 29 engaged in the thread 22 of the spindle 21 and having a head 30 which may be brought into abutment with the ends of the fingers 26 of the sleeve, either directly or indirectly through the medium of the gauge body 9, to force the sleeve backward upon the said spindle 21 and thereby cause the tapered nose of the spindle to effect the lateral expansion of the sleeve by virtue of the radial spreading of the said fingers.

When it is desired to readjust the inserts of the gauge for resetting or re-grinding, the body of the gauge with its inserts is removed from the spindle 5 and the slotted end of the arbor sleeve is inserted into the body so that the rounded bearing surfaces 27 engage the inner ends of the inserts, as clearly shown in Figure 8, the set screws 18, of course, being loosened to permit movement of the inserts. The arbor spindle 21 is passed rearwardly through the sleeve to effect contact between the tapered nose 23 thereof and the internal abutments 28 of the sleeve fingers and the screw 29 is threaded into the said spindle until the head or shoulder 30 effects the expanding movement of the fingers over the nose of the arbor spindle, and in turn effects the outward radial movement of the inserts in the body of the gauge to the required extent.

This extent may be determined by means of a ring gauge 31, bored at 32 and 33 to larger and smaller gauge diameters, so that the fingers may be moved within the said ring gauge until they contact such bore thereof as may be desired. For instance, if the gauge is to be re-ground it may be expanded to the size of the larger bore after which the fingers are locked by means of the set screws and then ground back to the size of the small bore, but any suitable methods of determining the final position of adjustment either for resetting or re-grinding may be adopted.

Re-grinding may be effecting while the gauge is still upon the expanding arbor, which may operate as the mandrel during such re-grinding, or, after the expanding arbor has performed its adjusting operation and the set screws have been tightened, the said expanding arbor may be removed and a solid mandrel substituted therefor, if so desired.

This invention may be developed within the scope of the following claim without departing from the essential features of the said invention and it is desired that the specification and drawings be read as being merely illustrative and not in a limiting sense, except as necessitated by the prior art.

What I claim is:

A gauge comprising a gauge body having open radial grooves in one face thereof, fingers closely fitting said grooves and being radially adjustable therein, said fingers being L-shaped in side elevation with the outer edge arcuate when viewed from the front or rear of the finger, the thickness of the leg of said fingers being substantially equal to the depth of said grooves, the base of said fingers being substantially equal in thickness to the thickness of said body.

RALPH O. BOEHNKE.